Dec. 10, 1935.  H. A. S. HOWARTH  2,023,764
BEARING
Original Filed April 12, 1927
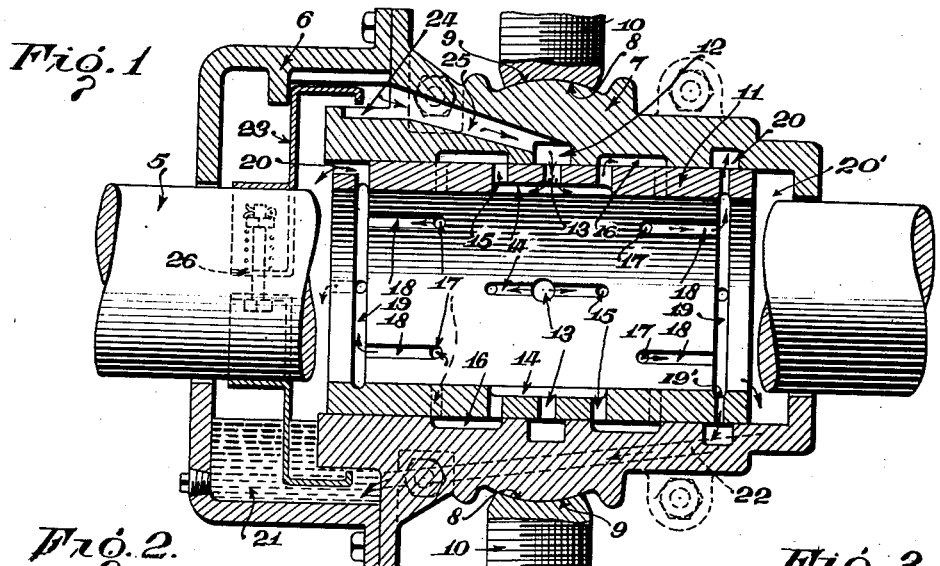
Inventor
Harry A. S. Howarth.
By
Cameron, Kerkam and Sutton.
Attorneys Patented Dec. 10, 1935

2,023,764

UNITED STATES PATENT OFFICE 2,023,764

BEARING

Harry A. S. Howarth, Philadelphia, Pa., assignor to Kingsbury Machine Works, Inc., Frankford, Philadelphia, Pa., a corporation of Delaware Original application April 12, 1927, Serial No. 183,135. Divided and this application December 21, 1928, Serial No. 327,664

28 Claims. (Cl. 308—121)

This invention relates to bearings, and more particularly to combined thrust and steady bearings, although certain features thereof are applicable to journal bearings generally. This application is a division of application Serial No. 183,135, filed April 12, 1927, Patent No. 1,760,904, granted June 3, 1930 of the present applicant.

It is an object of this invention to provide a steady bearing or other form of journal bearing with a novel arrangement of oil grooves whereby the drawing of air into the oil film may be prevented, or whereby the oil film produced may be so disposed as to maintain the desired balance of the oil film axially of the bearing, or whereby vibration of the shaft may be prevented, or controlled, or whereby a combination of these results may be obtained if desired.

Another object of this invention is to provide a novel steady bearing support whereby the steady bearing may be made self alining, if desired.

Another object of this invention is to provide a self-alining steady bearing with oil grooves which maintain the desired balance of the oil film with respect to the axis about which alinement is effected.

Another object of this invention is to provide a novel combined thrust and steady bearing wherein the lubrication of the steady bearing is effected from the oil provided for lubricating the thrust bearing.

Another object of this invention is to provide a combined thrust and steady bearing which is possessed of any desired combination of the features above referred to.

Other objects will appear as the description of the invention proceeds.

The invention is capable of receiving a variety of mechanical expressions, several of which are shown on the accompanying drawing, but it is to be expressly understood that the drawing is for purposes of illustration only and is not to be construed as a definition of the limits of the invention, reference being had to the appended claims for that purpose.

Referring to the drawing, wherein the same reference characters are employed to designate corresponding parts in the several figures, Fig. 1 is an axial section of a steady or journal bearing embodying the present invention and illustrating a novel arrangement of oil grooves;

Fig. 2 is a diagrammatic view illustrating another arrangement of oil grooves in circumferential development;

Fig. 3 is a diagrammatic view illustrating a further arrangement of oil grooves in circumferential development; and Fig. 4 is a schematic section showing another embodiment of this invention comprising a combined thrust and steady bearing.

Referring to Fig. 1 of the drawing, the shaft 5 is shown disposed horizontally in a steady bearing 11 which is carried by a shell 7 having fixed thereto an oil pot 6. While only a steady or journal bearing is shown in this figure, it is to be understood that it is to be associated immediately with a thrust bearing if so desired. The shell or sleeve 7 of the steady or journal bearing is shown as provided intermediate its length with opposed spherical surfaces 8 which contact with complementary surfaces 9 on the support 10 for said shell, the support being shown as taking the form of a pair of screws supported in any suitable way, thus rendering the steady or journal bearing self-alining. The shell 7 may be made in halves for convenience of assembly, if so desired.

The present invention involves novel principles in the arrangement and character of oil grooves employed for supplying the surface of the bearing with lubricant, and is applicable not only to steady bearings as here shown, but also to journal bearings generally.

In the embodiment illustrated in Fig. 1, shaft 5 cooperates with the stationary bearing member 11, which may be a journal brass or a babbitt bushing or be of any suitable construction. The oil is delivered to a circumferential groove or chamber 12 formed in the sleeve 7 or in the rear of the bushing 11, and flows therefrom through a plurality of circumferentially arranged apertures 13, disposed in a medial circumferential line, into a plurality of axially extending oil grooves 14 in the bearing face of the bushing 11. The oil flowing into the grooves 14 divides and flows in opposite directions toward the extremities of the bearing surfaces for a portion of the length thereof, here shown as approximately one-third of their length, and then flows outwardly through passages 15 into oil passages or chambers 16, formed in the sleeve 7 or in the bushing 11, which also lead toward the opposite extremities of the bearing surfaces. From the passages or chambers 16 the oil flows inwardly to the bearing surfaces through passages 17 and thence to the opposite extremities of the bearing surfaces through grooves 18 formed in the stationary bearing surface. Said grooves 18 terminate in circumferential air seal grooves 19 in the stationary bearing surface, disposed adjacent the opposite extremities thereof, from which the oil flows through suitable openings 19' to passages 20 in the bushing 11 or shell 7 or both, which are connected to the oil reservoir 21. A passage 22 in the shell 7 is illustrated for conveying the oil from the remote groove 20 to the reservoir 21, and the near groove 20 is shown as discharging directly into said reservoir through suitable openings.

The surplus oil which cannot pass through the openings 19' flows along the bearing surface into the channel 20' formed between the end of bushing 11 and shell 7, and returns to the oil reservoir through passage 22.

It will be noted that the air seal grooves 19 are maintained filled with oil at or above atmospheric pressure during the operation of the bearing. Hence, if the oil film pressure adjacent these grooves should fall to or below atmospheric pressure, the grooves will supply oil thereto, preventing the entrance of air, and preserving the integrity of the film. The channel 20' is merely a drain to prevent the oil from working along the shaft outside the bearing. Obviously, additional oil drain grooves may be used if deemed desirable.

Thus, in this embodiment, the oil is delivered to the bearing surfaces at a medial circumferential line and flows in opposite directions to the extremities of the bearing surfaces, where the oil is collected in circumferential grooves 19 adjacent the extremities of the bearing surfaces. Moreover, the grooves 18 at each extremity of the bearing surfaces are of the same length as and in alinement with the corresponding grooves at the opposite extremity, and said grooves 18 are also in alinement with the medial line between successive grooves 14 which latter grooves extend axially of the bearing surfaces to an equal extent on either side of the circumferential medial line and in alinement with the medial line between the grooves 18. Therefore, the oil grooves are symmetrically arranged with respect to the medial circumferential line of the bearing.

This disposition of the oil grooves effects a balance of the pressures in the oil films with respect to the medial circumferential line of the bearing surfaces. Thus when any given element of the bearing surface of the shaft is opposite a groove 14, where the oil pressure falls nearly to atmospheric, the shaft is supported at either side of the groove 14 by two oil films of equal size extending between the grooves 18 on the opposite sides of the axial line passing through the groove 14. When said element is opposite a pair of grooves 18, so that the oil pressure adjacent the extremities of this line drops nearly to atmospheric, the shaft is supported midway of the length of the bearing surfaces by an oil film extending between the pair of grooves 14 on either side of the line passing through the grooves 18, and this film extends equally on opposite sides of the medial circumferential line. This condition is true for every element of the bearing surface of the shaft and therefore the shaft is supported throughout its bearing surface by films which are balanced axially of the shaft with respect to the medial circumferential line, so that there is less tendency for unbalanced films to set the shaft into vibration. This is particularly important where the bearing is self-alining so that the stationary bearing member has facility of movement and may be set into vibration by unbalanced oil film pressures.

The proper bearing action is further aided by the presence of the circumferential grooves 19 adjacent the opposite extremities of the bearing surfaces. These grooves are normally maintained full of oil and therefore act as air seals, preventing the admission of air into the films between the bearing surfaces, and therefore preventing the film being destroyed with the consequent lack of support of the shaft by an oil film pressure where such occurs. It is to be noted that all of the oil grooves of this embodiment extend axially of the shaft, and therefore they have no pumping action on the oil, but the quantity of oil flowing therethrough depends entirely upon the quantity and pressure of the source. With this arrangement there is no danger of the oil grooves pumping the oil out of the bearing surfaces more rapidly than it is delivered thereto. However, the air sealing oil grooves at the extremities of the bearing surfaces may be employed with other arrangements of oil grooves, as hereinafter explained, including helical arrangements whereby the grooves effect a pumping action, and whether or not the oil grooves are so arranged as to give balanced films. In general, films balanced axially of the shaft are obtained when the oil grooves are symmetrically arranged with respect to a circumferential medial line so that every element of the shaft surface is acted upon by balanced moments of pressure, and with this limitation the oil grooves may be inclined to the axis or helical, so as to have a pumping action, or they may cross each other or be reverse helices, etc. On the other hand, a lack of symmetry results in a lack of balance in the oil film, and vibrations in the shaft may be set up. This may be taken advantage of to set up a predetermined vibration in the shaft which is different from the normal tendency of the shaft at its own period or the period of vibration of the parts connected thereto, so as to effect a damping action on the vibration of the shaft. The oil may be delivered to the groove or chamber 12 in any suitable way as by a viscosity pump. In the form shown in Fig. 1, the shaft 5 carries a channel-shaped oil-collecting ring 23 which at its upper end overhangs the end of the sleeve 7, so that oil taken up by said ring from the reservoir 21 delivers the same to a groove or channel 24 which communicates with a passage 25 in the sleeve 7, leading to the groove or chamber 12. The channel-shaped oil-collecting ring 23 is preferably made in halves which may be hinged together and clamped around the shaft 5 by any suitable lock or retaining means such as is diagrammatically illustrated at 26.

In the embodiment shown in Fig. 1 the oil is delivered to the bearing surfaces in a medial circumferential line, but this is not essential, as the oil may be delivered to the bearing surfaces at the sealing grooves at one extremity of the bearing surfaces, and be caused to flow lengthwise of the bearing surfaces, discharging through the opposite oil sealing grooves. When this arrangement is employed the supports for the steady bearing may be placed nearer the end where the cool oil enters than the opposite end, because as the oil passes between the bearing surfaces it becomes heated and thinner, and therefore the films at the hotter end of the bearing should have longer moment arms than the films at the cooler end of the bearing. In any event the supports for the steady bearing, where the latter is made self-alining, will be in the plane of the resultant of the pressures on the film existing between the bearing surfaces.

Figs. 2 and 3 show, in circumferential development, two arrangements of grooving embodying the present invention and employing air sealing grooves 30 and 31 adjacent the opposite extremities of the bearing surfaces. In the form shown in Fig. 2 the grooving is so arranged that the films are not symmetrical axially of the bearing, and this is suitable for use where the steady bearing is mounted rigidly without provision for self-alinement. In the form shown in Fig. 3 the grooves are shown symmetrical axially of the bearing, and this arrangement is suitable where the steady bearing is mounted with provision for self-alinement.

In Fig. 2, assuming that the oil is delivered to the groove 30, it flows axially of the bearing surface through grooves 32 in the bearing surface, then through passages 33 at the rear of the bearing surfaces, and then through grooves 34 in the bearing surface, the latter grooves delivering to the air sealing grooves 31. In this arrangement an element of the bearing surface of the shaft when opposite one of the grooves 32 is substantially unsupported adjacent one end of the bearing surface, while at the opposite end of the bearing surface it is supported by the oil film between the pair of grooves 34 on either side of said grooves 32. When said element is opposite one of the grooves 34 the conditions are reversed, and the element is substantially unsupported at the latter end of the bearing surfaces while it is supported by a film extending between two of the grooves 32 at the former end of the bearing surfaces. Hence there is a periodic increase and decrease of pressure adjacent the opposite extremities of the bearing surfaces, the periodicities at the two ends of the bearing surface being out of phase, so that the shaft tends to be set into vibration.

In the form shown in Fig. 3, assuming the oil is delivered to the groove 30, it first flows axially of the shaft through grooves 35 in the bearing surface, then through passages 36 at the rear of the bearing surfaces, then through the grooves 37 in the bearing surface disposed midway between the grooves 30 and 31, then through passages 38 at the rear of the bearing surfaces, and then through grooves 39 in the bearing surface in alinement with and of equal length to the passages 35, the latter grooves 39 delivering to the groove 31. In this construction the oil films are balanced with respect to the medial circumferential line of the bearing surfaces because of the symmetrical arrangement of the oil grooves, the relation of the oil films being the same as that described in conjunction with Fig. 1 except that the oil is flowing from one extremity of the bearing surfaces to the other instead of being delivered midway of the length of the bearing surfaces.

The number of grooves around the bearing surface in a circumferential direction may be varied in conformity with the character of film action desired. In general it is desirable to arrange the grooves symmetrically around the shaft circumferentially, and the number of systems of similar grooves in a circumferential direction determines the tendency of the shaft to vibrate. For example, if there are four systems of similar grooves around the circumference of the bearings there is a periodic change in the pressure of the film opposite any given element of the bearing surface of the shaft four times in each revolution and, depending upon the speed of rotation of the shaft, there is a tendency of the shaft to vibrate at the period so determined. This periodicity can be increased or decreased by increasing or decreasing the number of systems of grooves and thereby synchronization of the natural period of the shaft and the part which it carries with the period which the film tends to set up can be avoided, and this may be taken advantage of in damping the vibratory action of the shaft under the action of the machinery connected thereto.

The advantages available from the use of oil grooves disposed in accordance with this invention will be apparent from a consideration of some of the conditions which may exist:—

First, the shaft may be out of balance so that it presents its load against the bearing successively in every radial direction. This may occur regularly, as for example, with an unbalanced crankshaft, or intermittently, as for example, when a boulder gets caught in the impeller of a dredge pump. Under these conditions the bearing should be capable of sustaining a load directly against any portion of its circumference. Similarly, when the bearing is to be used in a horizontal motor for a belt drive, and the direction of belt pull is not known by the manufacturer, the bearing should be capable of taking the belt pull in any direction.

On the other hand, if the direction of maximum load is known, as for example, in a motor drive where the belt pull is downward and increases the weight on the bearing, the axial grooves need not be equally spaced circumferentially, but may be so arranged as to present a maximum bearing capacity in the direction of greatest load.

Vibrations existing in a shaft may be of three general types, occurring either singly or in conjunction:

(a) When the shaft under deflection in any direction swings like a hammock.

(b) When the shaft, deflecting in a given direction, increases or decreases that deflection like the bending of a leaf spring.

(c) In some shafts harmonics may be set up, where the nodes are at the bearings or elsewhere.

Vibration such as above described may be superimposed upon a shaft that is rotating with an unbalanced load so that the shaft swings in its bearings like a skipping rope. In that case it presents its pressure against the bearing surfaces in every radial direction successively during each turn of the rope, which may or may not coincide with the revolution of the shaft itself.

Generally speaking, balanced grooving is desirable in order to prevent metallic contact which might occur if the film was allowed to become too thin at either end of the bearings, due to shaft deflection, bearing rigidity, or misalinement from other causes.

It will be understood that the passages 33, 36 and 38 of Figs. 2 and 3 are separated from the bearing surface in order to prevent the falling of the oil pressure to or near atmospheric pressure in the regions between the inner ends of the axial grooves, and reducing the effective bearing area. Obviously, these passages may be formed in the bearing surface if deemed desirable, and if arcuate in extent they will act as pumps to assist or oppose the flow of oil.

Fig. 4 shows more or less schematically a combined thrust and steady bearing, embodying the present invention, for use in conjunction with horizontal or inclined shafts, and in some respects is similar to the embodiment of Fig. 1. In this embodiment the shaft 5 is provided with a thrust collar 45 with which cooperates stationary thrust bearing elements shown more or less diagrammatically. While the bearing has been shown as a single acting thrust bearing, it may with equal facility be a double acting thrust bearing. Surrounding the thrust bearing elements and the shaft 5 is a casing 46 which is secured in any suitable way, as by machine screws 47, to the base or foundation 48. Casing 46 not only affords a housing for the thrust bearing element at its portion 49 of larger diameter, but also constitutes a casing 50 for the journal bearing at its portion of smaller diameter, where it is shown as provided with a babbitt lining 51 containing oil grooves 52 of the character disclosed in the preceding figures. Said grooves 52 communicate with an air sealing oil groove 53 adjacent the outer extremity of the journal bearing surfaces, and the oil is returned from said groove 53 to the body of oil in the oil pot 54, also carried by the base or foundation 48, through one or more suitable grooves 55 in said base or foundation. An oil collecting groove 56 is also shown as communicating with the passage 55. Oil is supplied to the journal bearing surfaces from the space containing the thrust bearing elements through one or more suitable passages 57 in the casing 46, which passages communicate with the oil grooves 52 at one extremity and with the chamber containing the thrust bearing elements at the other extremity. The oil may be supplied to the chamber containing the thrust bearing elements in any suitable way, as by a viscosity pump 58, coacting with the periphery of the thrust collar 45. If desired, the viscosity pump may be so constructed as to collect and feed oil to the bearing surfaces for either direction of rotation of shaft 5.

It will therefore be perceived that a combined thrust and steady bearing has been provided wherein the support for the steady bearing is entirely independent of the size and shape of the pot or bearing housing, but may be determined by the size of the thrust bearing, so that the support for the steady bearing may be standardized and the steady bearing may be furnished as a unit. Moreover, the steady bearing may be made self-alining and lubricated by oil supplied from the thrust bearing if desired. Provision has also been made to prevent the drawing of air into the oil film, and to maintain the desired balance of the oil films, and to prevent or control or predetermine or damp the vibratory action of the shaft, and these features may be embodied in various forms of journal bearings as well as in steady bearings. Additionally, these features may be combined in various ways to secure the desired results.

While a number of embodiments of the invention have been shown and described in detail, it is to be expressly understood that the illustrated embodiments are not exclusive, as various other embodiments will now readily suggest themselves to those skilled in the art, while changes may be made in the details of construction, arrangement and proportion of parts, and certain features used without other features, without departing from the spirit of the invention. Reference is therefore to be had to the claims hereto appended for a definition of the limits of the invention.

What is claimed is:

1. In a journal bearing, relatively rotatable bearing members provided with circumferential air seal oil grooves to be filled with oil and thereby exclude air from the oil film, said grooves being disposed adjacent each extremity of the bearing surfaces, axially extending oil grooves intermediate said air seal grooves for forming a plurality of circumferentially arranged oil films between the bearing surfaces, said oil grooves communicating with said air seal grooves for free flow of oil therebetween, means for circulating oil to and through said oil grooves to supply said air seal grooves with oil above external air pressure and to maintain the same full of oil whereby the oil in said grooves supplies oil to said films upon the occurrence of a negative pressure therein, and an annular passage beyond and separated from the air seal oil groove for collecting oil leaking from said air seal oil groove along the shaft.

2. In a journal bearing, relatively rotatable bearing members provided with circumferential air seal oil grooves to be filled with oil and thereby exclude air from the oil film, said grooves being disposed adjacent each extremity of the bearing surfaces, axially extending oil grooves intermediate said air seal grooves for forming a plurality of circumferentially arranged oil films between the bearing surfaces, said oil grooves communicating with said air seal grooves for free flow of oil therebetween, means for circulating oil to and through said oil grooves to fill said air seal grooves with oil above external air pressure whereby the oil in said grooves supplies oil to said films upon the occurrence of a negative pressure therein, means to return the oil flowing through said air seal oil grooves at a rate adapted to maintain said grooves full of oil and an oil collecting channel axially beyond and separate from the air seal oil groove for collecting and returning oil escaping from said air seal oil groove along the shaft.

3. In a journal bearing, relatively rotatable bearing members provided with a circumferential air seal oil groove to be filled with oil and thereby exclude air from the oil film, said groove being disposed adjacent an extremity of the bearing surfaces and filled with oil above external air pressure whereby the oil in said groove supplies oil to the film between said bearing surfaces upon the occurrence of a negative pressure in said film, means for circulating a copious supply of oil to and through said groove to fill the same, means to return the oil flowing through and out of said groove at a rate adapted to maintain said groove full of oil and an oil passage axially beyond said air seal oil groove for collecting oil escaping axially therefrom.

4. In a journal bearing, relatively rotatable bearing members provided with a circumferential air seal oil groove to be filled with oil and thereby exclude air from the oil film, said groove being disposed adjacent an extremity of the bearing surfaces, means communicating with said groove and adapted to maintain an oil film having a lateral edge defined by said groove, said means also adapted to maintain said groove full of oil above external air pressure whereby it may supply oil to said film and exclude air therefrom, means to return the oil flowing through said groove, and an oil collecting channel axially beyond said air seal oil groove for collecting oil escaping axially therefrom.

5. In a journal bearing, relatively rotatable bearing members provided with a plurality of axially extending oil grooves for distributing oil to the bearing surfaces, forming a plurality of circumferentially arranged oil films, a circumferential oil groove adjacent an extremity of the bearing surfaces and communicating with said oil grooves for free flow of oil therebetween, and means for circulating oil to and through said first named oil grooves to form oil films and fill said circumferential groove, said last named groove being maintained full of oil whereby an oil seal is formed to prevent the entry of air into the oil film, and an oil collecting groove axially outside of and separated from said air seal oil groove.

6. In a self-alining journal bearing, in combination with means providing an axis about which alining movement is effected, relatively rotatable bearing members provided with circumferentially arranged sets of grooves spaced axially by a circumferential zone of bearing surface and arranged symmetrically with respect to the radial plane of said axis, and means for feeding oil to said grooves and communicating therewith substantially in the radial plane of said axis.

7. In a self-alining journal bearing, in combination with means providing an axis about which alining movement is effected, relatively rotatable bearing members provided with circumferentially arranged sets of axially extending staggered oil grooves spaced axially by a circumferential zone of bearing surface and symmetrically arranged with respect to the radial plane of said axis, and means for feeding oil to said grooves substantially in the plane of said axis.

8. In a self-alining journal bearing, in combination with means providing an axis about which alining movement is effected, relatively rotatable bearing members provided with circumferentially arranged sets of oil grooves extending for only a portion of the axial length of the bearing surfaces and axially spaced by a circumferential zone of the bearing surface, said grooves being symmetrically arranged with respect to the radial plane of said axis to produce oil films which are balanced with respect to said axis.

9. In a self-alining journal bearing, in combination with means providing an axis about which alining movement is effected, relatively rotatable bearing members provided with circumferentially arranged axially spaced sets of oil grooves extending for only a portion of the axial length of the bearing surfaces and communicating for flow of oil from one to another through connecting channels disposed rearwardly of said bearing surfaces, said oil grooves being symmetrically arranged with respect to the radial plane of said axis.

10. In a self-alining journal bearing, in combination with means providing an axis about which alining movement is effected, relatively rotatable bearing members provided with circumferentially arranged sets of staggered oil grooves separated by a circumferential zone of the bearing surface and communicating through connecting channels disposed rearwardly of said zone for flow of oil from one to another of said grooves, said grooves being symmetrically arranged with respect to the radial plane of the axis.

11. In a journal bearing, relatively rotatable bearing members provided with circumferentially-arranged axially-spaced sets of oil grooves symmetrically arranged with respect to the circumferential medial line of the bearing, and one or more circumferential air seal oil grooves adjacent the extremity of the bearing surfaces and communicating with said first named grooves for free flow of oil therebetween.

12. In a journal bearing, relatively rotatable bearing members provided with circumferentially-arranged sets of oil grooves spaced axially by a circumferential zone of the bearing surface and arranged symmetrically with respect to the circumferential medial line of the bearing, and means for feeding oil thereto at said circumferential medial line.

13. In a journal bearing, relatively rotatable bearing members provided with circumferentially-arranged axially-spaced sets of oil grooves which are symmetrically arranged with respect to the circumferential medial line of the bearing, air sealing oil grooves at each extremity of the bearing surfaces communicating with said first named grooves for free flow of oil therebetween, and means for feeding oil to one of said last named grooves.

14. In a journal bearing, relatively rotatable bearing members provided with axially extending oil grooves adjacent each extremity of the bearing surfaces and in the medial zone of the bearing surfaces, and passages at the rear of the bearing surfaces communicating at their opposite ends with said oil grooves for flow of oil from one to another of said grooves.

15. In a journal bearing, relatively rotatable bearing members provided with axially extending oil grooves adjacent each extremity of the bearing surfaces and with axially extending oil grooves in the medial zone of said bearing surfaces, said last named oil grooves being staggered with respect to said first named oil grooves, and passages at the rear of the bearing surfaces communicating at their opposite ends with said grooves for flow of oil from one to another of said grooves.

16. In a journal bearing, relatively rotatable bearing members provided with axially extending oil grooves adjacent each extremity of the bearing surfaces and in the medial zone of the bearing surfaces, passages at the rear of the bearing surfaces communicating at their opposite ends with said oil grooves for flow of oil from one to another of said grooves, and one or more air sealing circumferential oil grooves adjacent the extremity of the bearing surfaces.

17. In a journal bearing, relatively rotatable bearing members provided with axially extending oil grooves adjacent each extremity of the bearing surfaces and in the medial zone of the bearing surfaces, said grooves being symmetrically arranged with respect to the medial circumferential line of the bearing, and passages at the rear of the bearing surfaces communicating at their opposite ends with said oil grooves for flow of oil from one to another of said grooves.

18. In a steady bearing, relatively rotatable steady bearing members and means for mounting the stationary bearing member whereby it is self-alining, said stationary bearing member being provided with a plurality of circumferentially-arranged sets of oil grooves which are separated by a circumferential zone of bearing surface and arranged symmetrically with respect to said mounting means.

19. In a steady bearing, relatively rotatable steady bearing members and means for mounting the stationary bearing member whereby it is self-alining, said stationary bearing member being provided with a plurality of circumferentially-arranged sets of oil grooves symmetrically arranged with respect to said mounting means and with one or more circumferential air sealing oil grooves communicating therewith for free flow of oil therebetween and disposed adjacent the extremity of the bearing surfaces.

20. In a steady bearing, relatively rotatable steady bearing members and means for mounting the stationary bearing member whereby it is self-alining, said stationary bearing member being provided with axially extending staggered oil grooves which are spaced by portions of the bearing surface and symmetrically arranged with respect to the medial circumferential line of the bearing.

21. In a steady bearing, relatively rotatable steady bearing members and means for mounting the stationary bearing member whereby it is self-alining, said stationary bearing member being provided with axially extending oil grooves shorter than the axial length of the bearing surfaces and in communication for flow of oil from one to another through passages at the rear of the bearing surfaces, and said grooves being symmetrically arranged with respect to the medial circumferential line of the bearing.

22. In a steady bearing, relatively rotatable steady bearing members and means for mounting the stationary bearing member whereby it is self-alining, said stationary bearing member being provided with axially extending oil grooves shorter than the axial length of the bearing surfaces and in communication for flow of oil from one to another through passages at the rear of the bearing surfaces and said oil grooves being symmetrically arranged with respect to the medial circumferential line of the bearing and communicating with one or more circumferential oil grooves adjacent the extremity of the bearing surfaces.

23. In a steady bearing, relatively rotatable steady bearing members and means for mounting the stationary bearing member whereby it is self-alining, said stationary bearing member being provided with symmetrically arranged, staggered, axially extending oil grooves communicating for flow of oil from one to another through passages at the rear of the bearing surfaces and one or more circumferential oil grooves communicating therewith and disposed adjacent the extremity of the bearing surfaces.

24. In a journal bearing, relatively rotatable bearing members provided with axially extending oil grooves adjacent each extremity of the bearing surfaces, and intermediate passages at the rear of the bearing surfaces communicating at their opposite ends with said oil grooves for flow of oil from one to another of said grooves.

25. In a journal bearing, relatively rotatable bearing members provided with axially extending oil grooves adjacent each extremity of the bearing surfaces, said oil grooves being staggered with respect to each other, and intermediate passages at the rear of the bearing surfaces communicating at their opposite ends with said oil grooves for flow of oil from one to another of said grooves.

26. In a journal bearing, relatively rotatable bearing members provided with axially extending oil grooves adjacent each extremity of the bearing surfaces, intermediate passages at the rear of the bearing surfaces communicating at their opposite ends with said oil grooves for flow of oil from one to another of said grooves, and one or more air sealing oil grooves adjacent the extremity of the bearing surfaces.

27. In a journal bearing, relatively rotatable bearing members provided with axially extending oil grooves adjacent each extremity of the bearing surfaces, and intermediate passages at the rear of the bearing surfaces communicating at their opposite ends with said oil grooves for flow of oil from one to another of said grooves, said oil grooves being symmetrically arranged around the circumference of the bearing surfaces.

28. In a steady bearing, relatively rotatable steady bearing members and means for mounting the stationary bearing member whereby it is self-alining, said stationary bearing member being provided with a circumferential zone of bearing surface in radial alinement with said mounting means and with a plurality of sets of circumferentially arranged axially extending oil grooves for forming a plurality of sets of circumferentially arranged oil films which are axially spaced by said circumferential zone of bearing surface and balanced with respect to said mounting means.

HARRY A. S. HOWARTH.